US008832457B2

(12) United States Patent
Kumar et al.

(10) Patent No.: US 8,832,457 B2
(45) Date of Patent: *Sep. 9, 2014

(54) METHODS AND APPARATUS FOR AUTHENTICATING COMPONENTS OF PROCESSING SYSTEMS

(75) Inventors: Mohan J. Kumar, Aloha, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,334

(22) Filed: Jun. 25, 2012

(65) Prior Publication Data

US 2012/0265998 A1 Oct. 18, 2012

Related U.S. Application Data

(63) Continuation of application No. 11/648,511, filed on Dec. 29, 2006, now Pat. No. 8,209,542.

(51) Int. Cl.
*G06F 21/00* (2013.01)
*G06F 21/57* (2013.01)

(52) U.S. Cl.
CPC .............. *G06F 21/57* (2013.01); *G06F 21/575* (2013.01); *G06F 2221/2129* (2013.01)
USPC ............................ 713/187; 713/189; 713/193

(58) Field of Classification Search
CPC  G06F 21/57; G06F 21/575; G06F 2221/2129
USPC .......................................... 713/187, 189, 193
See application file for complete search history.

(56) References Cited

U.S. PATENT DOCUMENTS 6,292,890 B1 * 9/2001 Crisan ............................... 713/2
2002/0073316 A1 6/2002 Collins et al.
(Continued)

FOREIGN PATENT DOCUMENTS

EP 0707270 A2 4/1996
EP 0707270 A3 9/1996

OTHER PUBLICATIONS

Malipatlolla, "A Novel Architecture for a Secure Update of Cryptographic Engines on Trusted Platform Module", 2011, IEEE, p. 1-6.*

(Continued)

*Primary Examiner* — Taghi Arani
*Assistant Examiner* — Gregory Lane
(74) *Attorney, Agent, or Firm* — Trop, Pruner & Hu, P.C.

(57) ABSTRACT

When a processing system boots, it may retrieve an encrypted version of a cryptographic key from nonvolatile memory to a processing unit, which may decrypt the cryptographic key. The processing system may also retrieve a predetermined authentication code for software of the processing system, and the processing system may use the cryptographic key to compute a current authentication code for the software. The processing system may then determine whether the software should be trusted, by comparing the predetermined authentication code with the current authentication code. In various embodiments, the processing unit may use a key stored in nonvolatile storage of the processing unit to decrypt the encrypted version of the cryptographic key, a hashed message authentication code (HMAC) may be used as the authentication code, and/or the software to be authenticated may be boot firmware, a virtual machine monitor (VMM), or other software. Other embodiments are described and claimed.

21 Claims, 6 Drawing Sheets

(56) References Cited

U.S. PATENT DOCUMENTS

| | | | |
|---|---|---|---|
| 2003/0056107 A1 | 3/2003 | Cammack et al. | |
| 2003/0140238 A1* | 7/2003 | Turkboylari | 713/193 |
| 2003/0188176 A1 | 10/2003 | Abbondanzio et al. | |
| 2005/0010788 A1 | 1/2005 | Craft | |
| 2005/0091496 A1* | 4/2005 | Hyser | 713/175 |
| 2005/0125681 A1* | 6/2005 | Bressy et al. | 713/189 |
| 2005/0138370 A1* | 6/2005 | Goud et al. | 713/164 |
| 2005/0182940 A1* | 8/2005 | Sutton et al. | 713/179 |
| 2005/0187873 A1 | 8/2005 | Labrou et al. | |
| 2006/0021041 A1* | 1/2006 | Challener et al. | 726/24 |
| 2007/0192610 A1* | 8/2007 | Chun et al. | 713/176 |
| 2009/0031143 A1 | 1/2009 | Hodzic | |
| 2009/0282261 A1 | 11/2009 | Khan et al. | |

OTHER PUBLICATIONS

European Patent Office, Communication Pursuant to Article 94(3) EPC dated Nov. 10, 2009, in European patent application No. 07 254 930-2212.

State Intellectual Property Office, P.R. China, Second Office issued Feb. 25, 2011 in Chinese patent application No. 200710307265.6.

State Intellectual Property Office, P.R. China, Third Office Action mailed Jul. 13, 2011 in Chinese application No. 200710307265.6.

European Patent Office, Communication pursuant to Article 94(3) EPC dated Jul. 4, 2011 in European patent application No. 07 254 930.6-2212.

U.S. Appl. No. 11/601,321, Methods and Apparatus for Defeating Malware; Vincent Zimmer and Qin Long, P25000; filed Nov. 16, 2006.

"Trusted Platform Modules Strengthen User and Platform Authenticity," Trusted Computing Group, Jan. 2005, https://www.trustedcomputinggroup.org/specs/TPM/Whitepaper_TPMs_Strengthen_User_and_Platforrn_Authenticity_Final_1_0.pdf.

"Trusted Computing Platform," Wenbo Mao, HP Labs China, 2003, http://www.hpl.hp.com/personal/Wenbo_Mao/daonity/trustedcomputing.ppt.

"LaGrande Technology Preliminary Architecture Specification," Sep. 2006, Intel Corp. Document No. 315168002.

"LaGrande Technology Architectural Overview," Intel Corp., Sep. 2003.

Intel® Trusted Execution Technology: Preliminary Architecture Specification, Intel Corp., Nov. 2006 Whitepaper_TPMs_Strengthen_User_and_Platform_Authenticity_Final_1_0.pdf trustedcomputing.ppt LT Arch Spec-Sept 06.pdf LT_Arch_Overview.pdf-TXT-31516803.pdf.

* cited by examiner

METHODS AND APPARATUS FOR AUTHENTICATING COMPONENTS OF PROCESSING SYSTEMS

This application is a continuation of U.S. patent application Ser. No. 11/648,511, filed Dec. 29, 2006, now U.S. Pat. No. 8,209,542 the content of which is hereby incorporated by reference.

FIELD OF THE INVENTION

The present disclosure relates generally to the field of data processing, and more particularly to methods and related apparatus for authenticating components of processing systems.

BACKGROUND

A processing system may include hardware resources, such as a central processing unit (CPU), random access memory (RAM), and nonvolatile memory. The processing system may also include software resources, such as a basic input/output system (BIOS), a virtual machine monitor (VMM), and one or more guest operating systems (OSs) running on the VMM. When the computer system is started or reset, it may load the BIOS, and then the VMM. The VMM may then create one or more virtual machines, and the virtual machines may boot to different OSs or to different instances of the same OS.

In addition to RAM and one or more CPUs, a processing system may include a security coprocessor, such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputinggroup.org/home.

The sub-components of a TPM may include an execution engine and secure nonvolatile (NV) memory or storage. The secure NV memory is used to store sensitive information, such as encryption keys, and the execution engine protects the sensitive information according to the security policies dictated by the TPM's control logic.

In general, a TCG-compliant TPM provides security services such as attesting to the identity and/or integrity of the platform, based on characteristics of the platform. The platform characteristics typically considered by a TPM include hardware components of the platform, such as the processor(s) and chipset, as well as the software residing in the platform, such as the firmware and OS. A TPM may also support auditing and logging of software processes, as well as verification of platform boot integrity, file integrity, and software licensing. A TPM may therefore be considered a root of trust for a platform. However, the TPM typically also relies on certain code that is executed by the platform's CPU to be inherently reliable. That code is known as the core root of trust for measurement (CRTM).

Specifically, the TCG recognizes three primary roots of trust for a platform: the root of trust for storage (RTS), the root of trust for reporting (RTR), and the root of trust for measurement (RTM). As explained in the TCG glossary at https://www.trustedcomputinggroup.org/groups/glossary, the TPM typically serves as the RTS and RTR. By contrast, the RTM is typically "the normal platform computing engine, controlled by the CRTM. This is the root of the chain of transitive trust." Moreover, the TCG glossary explains that a root of trust is a "component that must always behave in the expected manner, because its misbehavior cannot be detected."

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
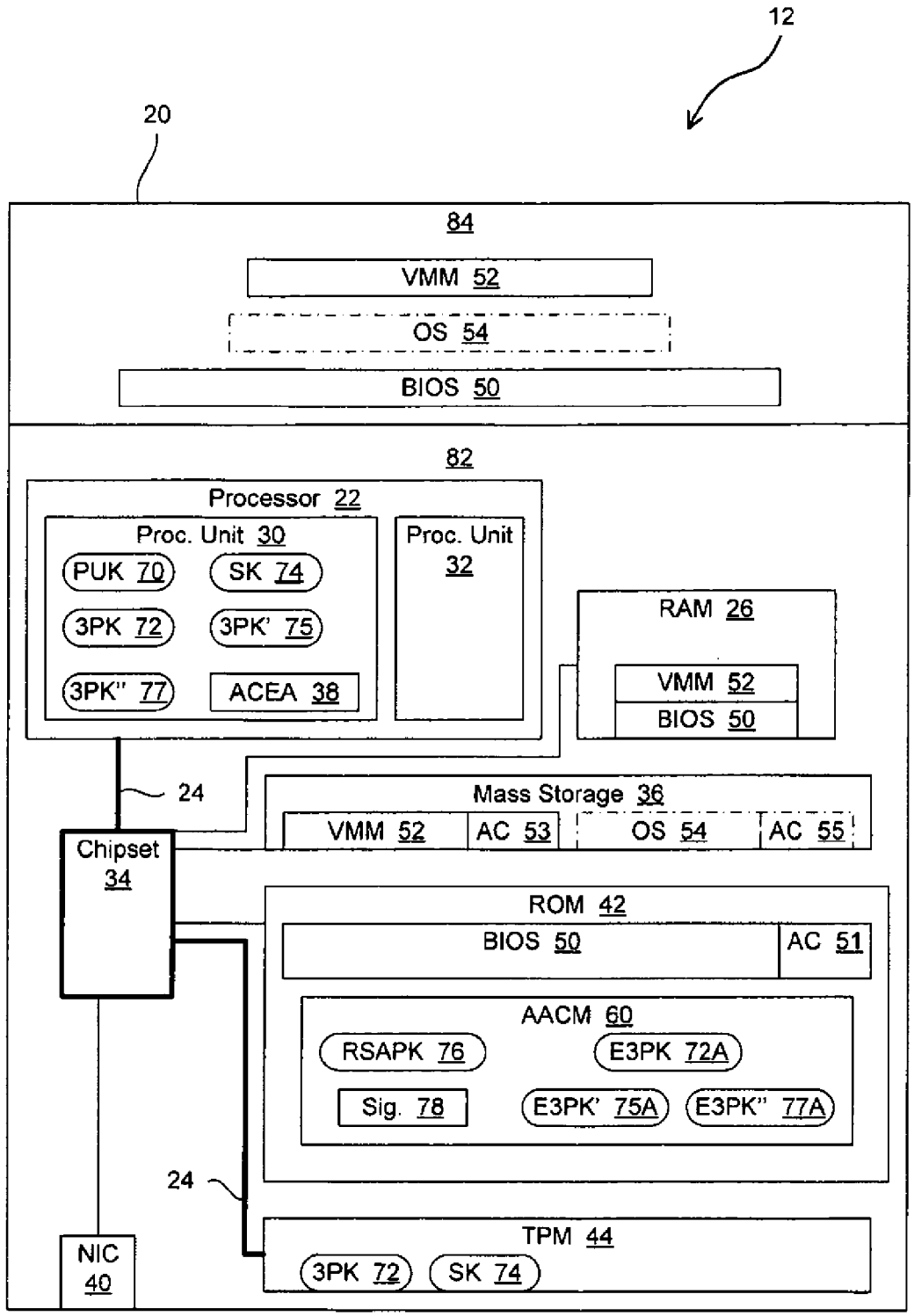
FIG. 1 is a block diagram depicting a suitable data processing system in which certain aspects of an example embodiment of the present invention may be implemented.

An embodiment of the present invention provides for authenticating platform components such as boot firmware and/or VMM code, thus providing enhanced security, relative to platforms that rely on such code to be inherently reliable. For instance, the platform may check the authenticity of the boot firmware in a system read-only memory (ROM). Alternatively, the code to be authenticated may include components such as an OS and/or a VMM from a hard disk or other mass storage device.

As background, in a platform with a TPM, platform measurements and encryption can be used to seal sensitive information or secrets to the TPM. For instance, in a processing system with a VMM, secrets can be sealed to the TPM using measurements of the VMM and other platform components. The TPM may prevent the secrets from subsequently being released or unsealed from the TPM unless VMM and other platform measurements are verified to match the measurements used for sealing. However, when a secret is unsealed, it may be communicated in plain text (i.e., not encrypted) over a communication channel in the processing system between the TPM and the CPU.

The present disclosure describes mechanisms and processes for communicating secrets between a security coprocessor (e.g., a TPM) and a processing unit (e.g., a CPU) in an encrypted format. Consequently, even if an attacker were to snoop the internal buses in the processing system, the attacker would not be able to intercept plain text secrets.

The described mechanisms and processes may be suitable for providing enhanced protection for high value content, with regard to digital rights management (DRM), for example. As described in greater detail below, in one embodiment, the data on the communication channel between the TPM and the CPU is encrypted using per-session cryptographic keys. In addition, the CPU and the TPM are provisioned in advance with a cryptographic key (referred to herein as a "third-party key" or "3PK") to be used for authenticating the session end points and creating the per-session cryptographic keys. The 3PK may therefore also be referred to as an authentication key.

For purposes of this disclosure, with regard to processing units and with regard to processing systems that include processing units, a "first party" is the manufacturer of the processor, and a "third party" is any other entity associated with the processing unit or processing system. For instance, manufacturers of processing systems and owners of processing systems are considered "third parties."

Referring again to the third-party key, the manufacturer of the CPU need not load the 3PK into the CPU or the TPM. Indeed, since the TPM is associated with the platform, if the CPU manufacturer does not also assemble platforms, the CPU manufacturer may have no opportunity to load the 3PK into the TPM. Instead, the 3PK, and the process for loading it into a processing system, can be controlled primarily by some other party, such as the manufacturer of the processing system. For example, as described in greater detail below, when building a processing system, an original equipment manufacturer (OEM) may obtain an augmented authentication code (AC) module that contains the third-party cryptographic key to be installed in the CPU of that processing system. As described in greater detail below, within the augmented AC module, the 3PK may be protected by encryption, based on a processing unit key (PUK). For purposes of this disclosure, a processing unit key or PUK is a cryptographic key that is stored in a processor when the processor is manufactured, and that remains in the processor in nonvolatile form. For instance, the processor may retain the key despite a power cycle or reset of the processor. The augmented AC module may also include preliminary boot code, and the augmented AC module may be protected with a signature.

The augmented AC module may be stored in boot storage (e.g., flash memory that typically contains the BIOS code). The platform builder may also install the 3PK into the TPM of the platform during platform manufacturing. Subsequently, on reset, the CPU may locate and run the preliminary boot code in the augmented AC module. Accordingly, AC modules, and similar types of modules, that have been augmented with an encrypted 3PK may be considered augmented boot code modules. In one embodiment, the CPU may use a firmware interface table (FIT) as a standard mechanism to locate and run the augmented AC module. Additional information about FITs is provided in the Intel® Itanium® Processor Family System Abstraction Layer Specification, dated December 2003, which may be obtained from the Internet at download.intel.com/design/Itanium/Downloads/24535907.pdf. When run, the augmented AC module may install the 3PK to CPU registers that are only modifiable by privileged code. Thus, a platform may use the methodology described herein to carry OEM keys in BIOS memory and securely install them into the processor at each boot.

An augmented AC module may also initialize the TPM and create a session key that will be used by the processor and TPM to encrypt data exchanged between the two components. For example, once 3PKs have been installed into the processor and the TPM, those keys can in turn be used to generate one or more session keys, using standard cryptographic schemes. The session is then used to secure communications between the processor and the TPM.

The described solution allows secure communication between a CPU and a security processor such as a TPM, thus ensuring secure exchange, even against an attacker with sophisticated snooping hardware and physical access to the machine. For instance, a platform according to the present disclosure may ensure that cryptographic keys used for protecting the data content (e.g., a key for protecting a Moving Picture Experts Group (MPEG) movie, a key for protecting a database of credit card information, etc.) are protected from in-target probe (ITP) based attacks.

In addition, the present disclosure describes a convenient, flexible way to provision a platform with keys for establishing a protected communication channel. A key may be selected by a third party and installed into a platform by that third party. The 3PK key need not be built in to the processor. The processor manufacturer therefore need not know the 3PK. In addition, should a processor be returned to the manufacturer, the processor may be reused without compromising the 3PK. A 3PK may be changed if needed by a trusted agent, and a 3PK may be tied to the processor only when the processor is present in a platform. Accordingly, such a 3PK may also be referred to as a platform key.

An OEM or other entity may also use the 3PK to create manifests for various software components of the processing system when assembling or configuring the processing system. The processing system may subsequently use the 3PK from the augmented AC module to authenticate those components, for example during boot. The processing system may thus avoid executing software components that have been infected with malware such as viruses, rootkits, virtual machine rootkits, etc. For instance, as described in greater detail below, the OEM may save a firmware manifest with an authentication code for the system firmware in the boot flash memory. When the processing system subsequently boots, before executing the firmware, the system may check the manifest to determine whether the firmware has been tampered with. Similar steps may be taken to protect other components, such as a VMM, an OS, etc.

Alternatively, the OEM may store more than one of these 3PKs in the augmented AC module, with each 3PK used for a different purpose. For instance, one 3PK may be used for establishing secure communications between the processor and the TPM, and other 3PKs may be used for (a) authenticating the platform firmware, (b) authenticating a host OS, and (c) authenticating a VMM.

FIG. 1 is a block diagram depicting a suitable data processing system 20 in which certain aspects of an example embodiment of the present invention may be implemented. Data processing system 20 has various hardware components 82, such as a central processing unit (CPU) 22, communicatively coupled to various other components via one or more system buses 24 or other communication pathways or mediums. This disclosure uses the term "bus" to refer to shared communication pathways, as well as point-to-point pathways. CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems, such as through a network interface controller (NIC) 40, a modem, or other communication ports or couplings. Processing systems may be interconnected by way of a physical and/or logical network, such as a local area network (LAN), a wide area network (WAN), an intranet, the Internet, etc. Communications involving the network may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Figure 2:
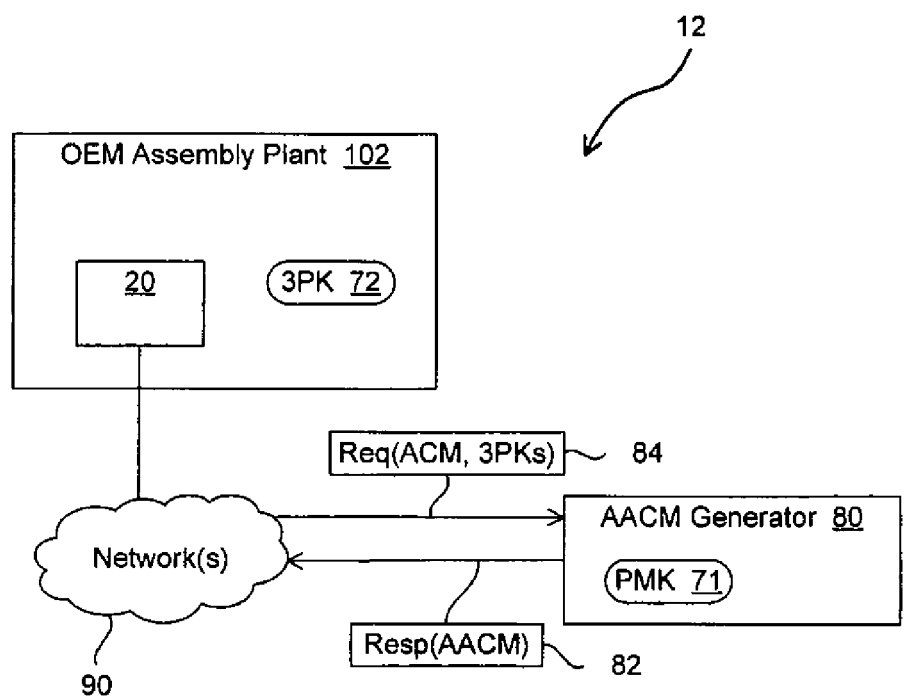
FIG. 2 is a block diagram depicting an example data processing environment involving the data processing system of FIG. 1.

FIG. 2 is a block diagram depicting an example data processing environment 12 involving processing system 20 from FIG. 1. In particular, data processing environment 12 includes processing system 20 as a local processing system, and a remote processing system referred to as an augmented authenticated code module (AACM) generator 80. Processing system 20 and AACM generator 80 may communicate via a network 90. For instance, processing system 20 may be located in an OEM assembly plant 102, and when the OEM is assembling or configuring processing system 20, the OEM may cause processing system 20 to communicate with AACM generator 80 to provision processing system 20 with one or more 3PKs specific to that OEM, as described in greater detail below with regard to FIG. 3. In particular, as described below, the OEM may cause AACM generator 80 to embed 3PK 72, 3PK' 75, and 3PK" 77 in the preliminary AC module, thereby converting it into an AACM specific to that OEM.

Referring again to FIG. 1, within processing system 20, processor 22 may be communicatively coupled to one or more volatile or nonvolatile data storage devices, such as RAM 26, read-only memory (ROM) 42, mass storage devices 36 such as hard drives, and/or other devices or media, such as floppy disks, optical storage, tapes, flash memory, memory sticks, digital video disks, etc. For purposes of this disclosure, the term "ROM" may be used in general to refer to nonvolatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports, input devices, output devices such as a display, etc.

In the embodiment of FIG. 1, processing system 20 also includes a TPM 44. In other embodiments, other types of security coprocessors may be used. Processor 22, RAM 26, TPM 44, and other components may be connected to a chipset 34. Chipset 34 may include one or more bridges or hubs for communicatively coupling system components, as well as other logic and storage components.

Some components, such as the video controller for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 20 may be considered components of a software environment 84.

For instance, when processing system 20 boots, a BIOS 50 and a VMM 52 may be loaded into RAM 26 and executed within software environment 84. VMM 52 may include components which more or less serve as an OS, or it may run on top of a host OS 54. BIOS 50 may be implemented in accordance with Version 2.0 of the Unified Extensible Firmware Interface Specification, dated Jan. 31, 2006, for instance. ROM 42 may also include modules such as an augmented AC module (AACM) 60. As described in greater detail below with regard to FIG. 6, AACM 60 may cause processing system 20 to authenticate BIOS 50, OS 54, and/or VMM 52 before allowing them to run.

Figure 3:
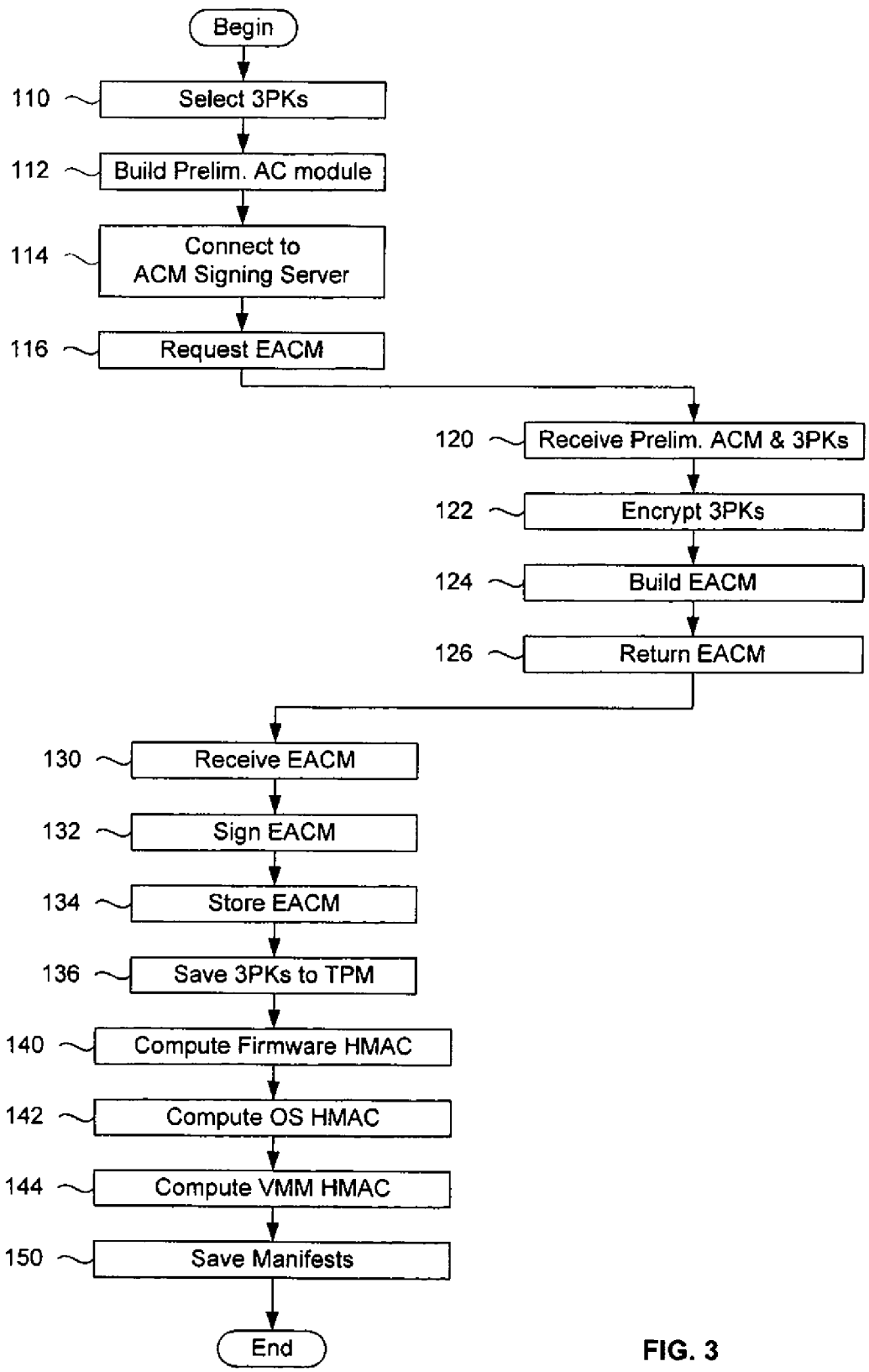
FIG. 3 is a flowchart of a process for provisioning the processing system of FIG. 1 with a third-party key and various manifests, according to an example embodiment of the present invention.

FIG. 3 is a flowchart of a process for provisioning processing system 20 with 3PKs, according to an example embodiment of the present invention. The illustrated process pertains to assembly or configuration operations managed by an OEM, beginning after the OEM has selected processing system 20 to be provisioned with a 3PK. At block 110, the OEM selects the 3PKs to be provisioned.

At block 112, the OEM prepares a preliminary AC module. In the example embodiment, the OEM uses a format such as the one described in the LaGrande Technology Preliminary Architecture Specification, dated September 2006 (hereinafter "the LTPA Specification"), for the AC module. The LTPA Specification is currently available from the Internet at www.intel.com/technology/security/downloads/LT_spec_0906.pdf.

The example processing system of FIG. 1 provides launch and control interfaces using functions known as safer mode extensions (SMX). Additional information concerning SMX may be obtained from the LTPA Specification. The LTPA Specification also describes how an AC module can be authenticated and executed. For example, pages 11 and 12 provide the following explanations:

> To support the establishment of a protected environment, SMX enables the capability of an authenticated code execution mode. This provides the ability for a special code module, referred to as the authenticated code module (AC module), to be loaded into internal RAM (referred to as authenticated code execution area) within the processor. The AC module is first authenticated and then executed using a tamper resistant method.
>
> Authentication is achieved through the use of a digital signature in the header of the AC module. The processor calculates a hash of the AC module and uses the result to validate the signature. Using SMX, a processor will only initialize processor state or execute the AC code module if it passes authentication. Since the authenticated code module is held within internal RAM of the processor, execution of the module can occur in isolation with respect to the contents of external memory or activities on the external processor bus.

Referring again to block 112, to prepare the preliminary AC module, the OEM may load user code/data into the user area of the preliminary AC module. Here, the preliminary AC module serves as a formatted input of OEM content that needs to be embedded in the augmented AC module. In the example embodiment, the code in the user area includes instructions and data to control the preliminary boot operations before control is given to BIOS 50. Processing system 20 may also populate other portions of the preliminary AC module, such as the size field, for instance.

As shown at block 114, processing system 20 may then connect to AACM generator 80. In the example embodiment, processing system 20 and AACM generator 80 establish a secure channel to communicate encrypted data. Any suitable technique may be used to establish that secure channel. As shown at block 116, processing system 20 may then send a message or request 84 to AACM generator 80. As shown in FIG. 2, request 84 may include the preliminary AC module, as well as the desired 3PKs. In the example embodiment, the preliminary AC module will contain a field that the OEM or third-party manufacturer populates to indicate the processor family for which the AACM is sought. As shown at blocks 120 and 122, AACM generator 80 may receive the preliminary AC module and the 3PKs from processing system 20, and may then encrypt the 3PKs.

In the embodiment of FIG. 2, AACM generator 80 is managed by the manufacturer of processor 22, and AACM generator 80 uses a predetermined processor manufacture key (PMK) 71 to encrypt the 3PKs. In the embodiment of FIG. 2, PMK 71 is a private key, and processing unit 30 includes a PUK 70 that is the corresponding public key. In another embodiment, the PMK and the PUK may be the same key (i.e., they may have the same value).

In the embodiment of FIG. 1, PUK 70 may be permanently burned into processing unit 30 by the manufacturer of processor 22 during the manufacturing process, before processor 22 is shipped to a purchaser such as an OEM. The manufacturer of processor 22 may keep PMK 71 secret, such that no other entity ever learns the value of PMK 71. Alternatively, the processor manufacturer may arrange for a separate trusted entity to manage AACM generator 80. Although PUK 70 may be considered a "public" key, it may also be kept secret, such that its value is never released by processing unit 30.

Referring again to FIG. 3, AACM generator 80 then builds an AACM 60 that includes the encrypted 3PKs, as shown at block 124. For example, referring back to FIG. 1, AACM generator 80 may include the following 3PKs in AACM 60: encrypted 3PK (E3PK) 72A, E3PK' 75A, and E3PK" 77A. In particular, referring again to FIG. 2, when AACM generator 80 builds AACM 60, AACM generator 80 may append the E3PKs to the user data of the preliminary AC module and update the module size field. Alternatively, AACM 60 may include one or more predefined fields for holding encrypted 3PKs. An AACM that includes an encrypted version of a 3PK may also be referred to as an encrypted AC module.

Figure 4:
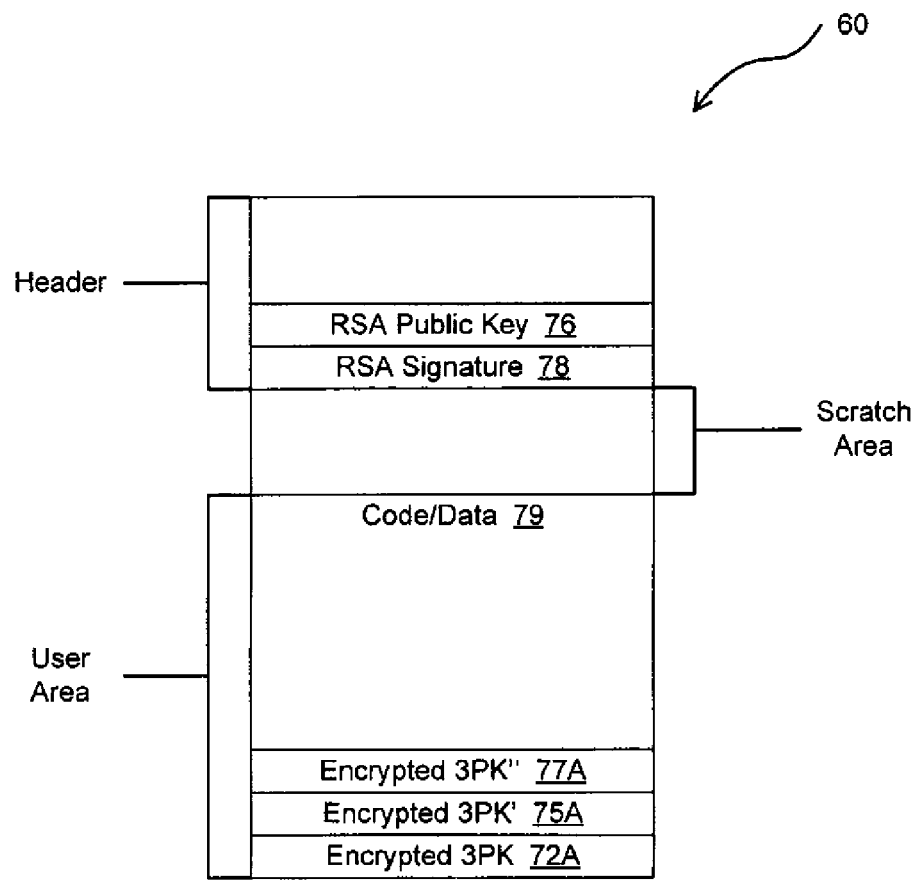
FIG. 4 is a block diagram of an augmented authenticated code module, according to an example embodiment of the present invention.

FIG. 4 is a block diagram of AACM 60 from FIG. 1, showing a module header, which is followed by a scratch area, followed by a user area with the encrypted 3PKs appended at or near the end of the module, following the user code/data from the preliminary AC module. Alternatively, an AC module may be structured with one or more independent fields to hold encrypted 3PKs, possibly in the module's header. The instructions and other data in the use area, which are used to control the preliminary boot operations, are referred to herein as AACM code 79.

Referring again to FIG. 3, AACM generator 80 then sends AACM 60 to processing system 20, as shown at block 126. Processing system 20 may receive AACM 60 from AACM generator 80 at block 130. Processing system 20 may then sign AACM 60, as indicated at block 132. For example, the OEM may select an AC module key pair, such as a Rivest, Shamir, Adelman (RSA) public/private key pair, and may then load the public key from that pair into the header of AACM 60. The OEM may use the private key from that pair to generate an RSA signature for AACM 60, possibly based on a hash of the user area and possibly other portions of AACM 60. The OEM may then store that RSA signature in the header of AACM 60. Referring again to FIG. 4, such an RSA public key 76 and such an RSA signature 78 are depicted in the header of AACM 60.

Thus, the OEM (or other third party) may select the 3PKs as well as the RSA public key for the AC module. Consequently, to distinguish between those keys, the RSA public key may be referred to as the primary module key, and the 3PKs may be referred to as supplemental module keys.

As shown at block 134, processing system 20 may then store AACM 60 in ROM 42, as depicted in FIG. 1. In the embodiment of FIG. 1, processing unit 30 is configured to serve as a bootstrap processor (BSP), and processing system 20 is configured to use ROM 42 as the boot storage (i.e., the nonvolatile storage from which processing unit 30 obtains instructions for initializing and configuring processing system 20 at power up or reset).

Thus, an OEM or other entity performing system configuration may install cryptographic keys such as E3PK 72A into the system ROM (e.g., ROM 42). Furthermore, since E3PK 72A is itself encrypted, even if an attacker were able to extract E3PK 72A from ROM 42, the attacker still would not be able to decrypt and use E3PK 72A.

As shown at block 136 of FIG. 3, processing system 20 may then save one or more of the 3PKs (e.g., 3PK 72) into TPM 44. For instance, processing system 20 may securely install 3PK 72 and the other 3PKs into TPM 44 during each boot. Alternatively, the OEM could provision 3PK 72 and the other 3PKs into TPM 44 during processing system manufacturing.

Processing system 20 may then use one or more of the 3PKs to compute authentication codes for various software components to be protected, and processing system 20 may save those authentication codes as manifests in processing system 20. In the example embodiment, a hashed message authentication code (HMAC) is used for each authentication code or manifest. The HMACs may have the form $$HMAC_K(m)=h((K \text{ xor opad})\|h((K \text{ xor IPAD})\|m))$$

where m is the message or data to be protected, h is the hashing function, K is the selected 3PK (e.g., 3PK' 75), ipad is a predefined inner pad constant, and opad is a predefined outer pad constant. Additional information concerning HMACs is currently available from the Internet at http://en.wikipedia.org/wiki/HMAC.

For example, as depicted at block 140, processing system 20 may compute an HMAC for the system firmware of processing system 20. In particular, processing system 20 may use 3PK' 75 as K for the HMAC, and processing system 20 may use the firmware image (e.g., the contents of BIOS 50) as m for the HMAC. Similarly, as shown at blocks 142 and 144, processing system 20 may use 3PK" 77 to compute an HMAC for VMM 52, and processing system may use another 3PK to compute an HMAC for OS 54.

As indicated at block 150, processing system 20 may then save the HMACs as manifests for the corresponding components. For instance, as shown in FIG. 1, processing system 20 may append, prepend, or otherwise add a VMM authentication code (AC) 53 to VMM 52, a firmware AC 51 to BIOS 50, and an OS AC 55 to OS 54. Alternatively, manifests or authentication codes may be saved separately from the corresponding software modules.

Figure 5:
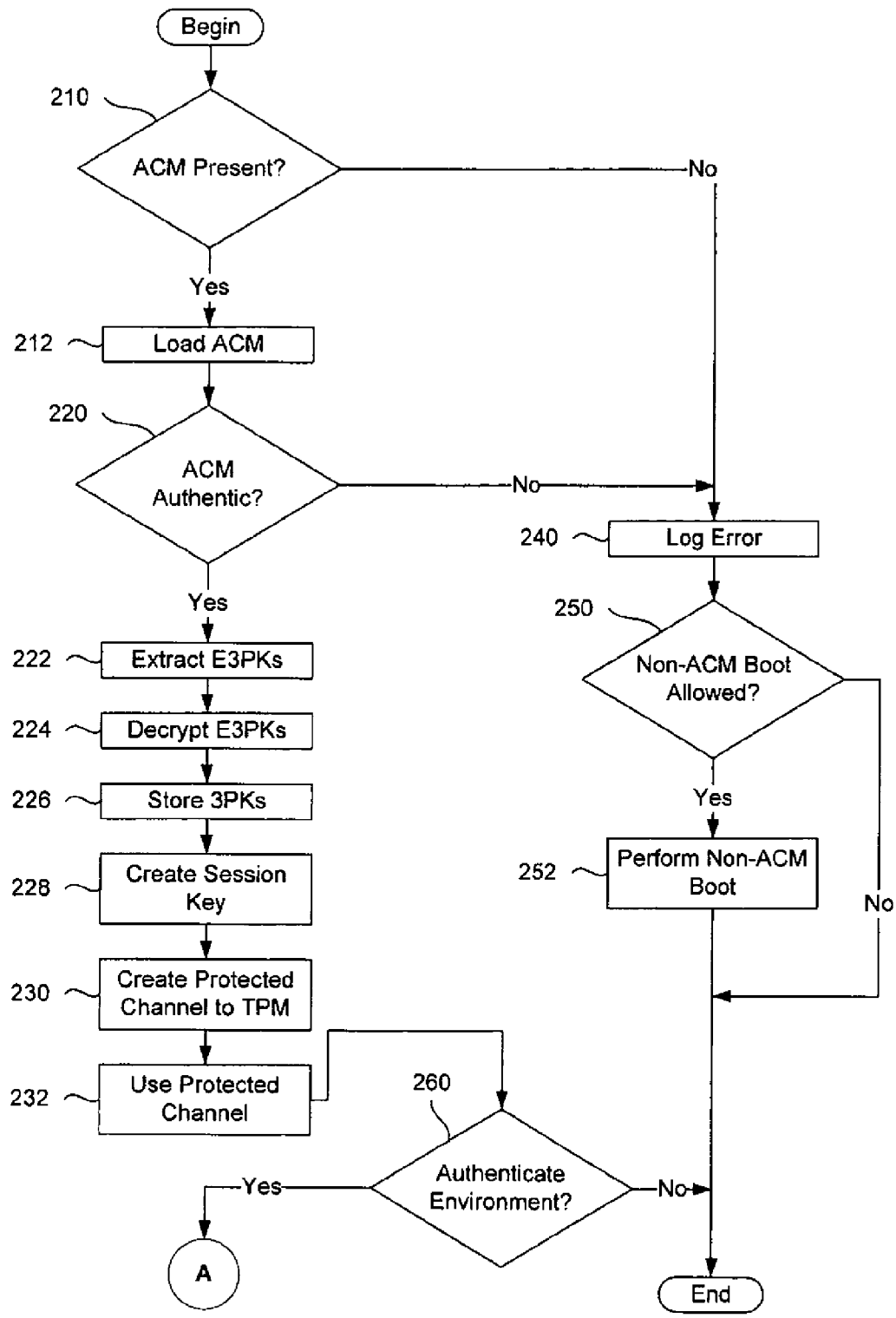
FIG. 5 is a flowchart of a process for establishing a protected communication channel between a processing unit and a security coprocessor, according to an example embodiment of the present invention.

FIG. 5 is a flowchart of a process for establishing a protected communication channel between a processing unit and a TPM according to an example embodiment of the present invention. FIG. 1 uses bold lines on buses 24 and chipset 34 to depict an example of such a secure channel as established between processing unit 30 and TPM 44 according to the process of FIG. 5. That process begins after AACM 60 with E3PK 72A has been stored in ROM 42, possibly according to a process such as the one described above.

In particular, the process of FIG. 5 may begin in response to processing system 20 being powered on or reset, which may cause microcode in processing unit 30 to examine a predetermined location in ROM 42 to determine whether ROM 42 contains an AC module. If an AC module is found, processing unit 30 may load the AC module into protected internal RAM within processing unit 30. The protected internal RAM to receive the AC module may be referred to as the authenticate code execution area (ACEA) 38.

For purposes of illustration, one may assume that processing unit 30 finds AACM 60 in ROM 42. As indicated at block 220, processing unit 30 may then determine whether AACM 60 is authentic, in accordance with the excerpt above from the LTPA Specification. For instance, processing unit 30 may (a) calculate a hash of certain portions of AACM 60, (b) use RSA public key 76 to decrypt signature 78, and (c) compare the decrypted signature with the hash to determine whether AACM 60 matches what the OEM originally signed with the corresponding RSA private key. Processing unit 30 may also verify RSA public key 76 against a predetermined list of valid public keys. For instance, processing unit may derive a hash value from RSA public key 76 and compare that value against a list of valid hash values in protected storage in processing system 20. If RSA public key 76 verifies good, and the hash of AACM 60 matches the decrypted RSA signature, processing unit 30 may conclude that AACM 60 is authentic.

If processing unit 30 is unable to find an AC module, or if processing unit 30 finds an AC module but determines that it is not authentic, processing unit 30 may log an appropriate error message, as indicated at block 240. Processing unit 30 may then check a configuration setting in processing system 20 to determine whether processing system 20 should be allowed to use a non-ACM boot process, as depicted at block 250. If a non-ACM boot is to be allowed, processing unit 30 may perform the non-ACM boot as depicted at block 252. If non-ACM boot is not allowed, the process may end without processing system 20 booting.

Referring again to block 220, if processing unit 30 determines that AACM 60 is authentic, processing unit 30 may then extract the E3PKs from AACM 60, as shown at block 222. Processing unit 30 may temporarily store the E3PKs in one or more processor registers or other internal storage, for instance.

Processing unit 32 then decrypts the E3PKs (e.g., E3PK 72A, E3PK' 75A, E3PK" 77A) and saves the results (e.g., 3PK 72, 3PK' 75, 3PK" 77) in protected storage within processing unit 32, as shown at blocks 224 and 226. In the embodiment of FIG. 1, that protected storage is implemented as one or more registers that (a) are only modifiable by privileged code; (b) cannot be read, written, or debugged by non-privileged code; and (c) cannot be accessed by ITPs. In this context, privileged code is code that could be carried external to the processor, but that requires special authentication before it is run by the processor, and that then runs in the processor in a sanitized environment, such that the privileged code execution cannot be observed or manipulated by malicious parties. In an alternative embodiment, the processing system may wait until a future time to decrypt the E3PKs that aren't needed for establishing a secure channel with the TPM. In the embodiment of FIG. 1, processing unit 30 uses PUK 70 to decrypt the E3PKs.

As shown at block 228, processing unit 30 and TPM 44 may then use 3PK 72 to create a session key (SK) 74 to be used for protecting communications between processing unit 30 and TPM 44. Processing unit 30 and TPM 44 may then use SK 74 to create a protected channel, as shown at block 230. That protected channel may traverse multiple system buses 24 and zero or more components of chipset 34. TPM 44 and processing unit 30 may then use SK 74 to encrypt communications, as indicated at block 232. In alternative embodiments, multiple session keys may be used for protecting communications between processing unit 30 and TPM 44.

The protected channel may be used, for instance, to load keys or other protected information from TPM 44 into processing unit 30. Likewise, the protected channel may be used to send keys or other sensitive information from processing unit 30 to TPM 44. The protected channel thus ensures that any viewer of the channel cannot determine the contents of the communications, and protects against modification of the data in transit. Furthermore, the process for initializing the channel may authenticate the end-points to protect against unauthorized access and against replay and TPM swap attacks.

As shown at block 260, processing system 20 may then determine whether other components are to be authenticated in the preliminary phase of the boot process. If so, the process may pass through page connector A to FIG. 6.

Figure 6:
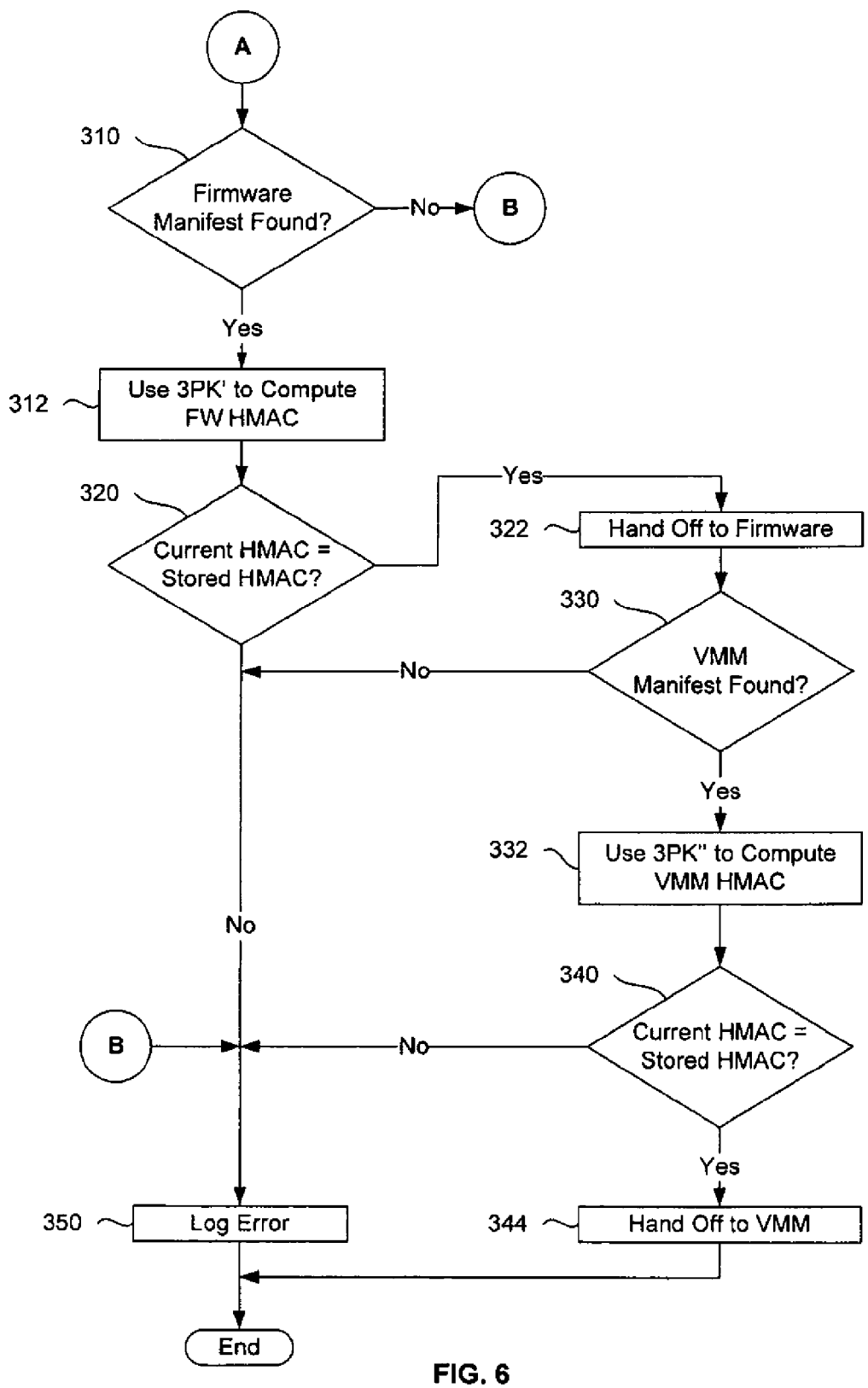
FIG. 6 is a flowchart of a process for authenticating components of the data processing system of FIG. 1, according to an example embodiment of the present invention.

FIG. 6 is a flowchart of a process for authenticating components of processing system 20, according to an example embodiment of the present invention. When control flows to FIG. 6 through page connector A, processing system 20 may attempt to locate a firmware manifest or authentication code, such as BIOS AC 51, as shown at block 310. If BIOS AC 51 is not found, processing unit 30 may log an error, as indicated at block 350, and the process may end without completing the boot process. If BIOS AC 51 is found, processing unit 30 may use 3PK' 75 to compute an HMAC for the current BIOS image, as indicated at block 312.

As shown at block 320, processing unit 30 may then compare BIOS AC 51 with the current AC to determine whether BIOS 50 has been tampered with. If the HMACs do not match, processing unit 30 may log an error as shown at block 350, and the process may end. If they do match, the preliminary boot code from AACM 60 may hand off control to the system firmware, as shown at block 322.

As shown at block 330, processing system 20 may then attempt to locate a manifest such as VMM AC 53 for VMM 52. If VMM AC 53 is not found, processing unit 30 may log an error, as indicated at block 350, and the process may end. However, if VMM AC 53 is found, processing unit 30 may use 3PK" 77 to compute an HMAC for the current VMM image, as indicated at block 332. As shown at block 340, processing unit 30 may then compare VMM AC 53 with the current AC to determine whether VMM 52 has been tampered with. If the HMACs do not match, processing unit 30 may log an error as shown at block 350, and the process may end. If they do match, BIOS 50 may hand off control to VMM 52, as shown at block 344. The above operations may be used when VMM 52 includes components that serve more or less as an OS.

When OS 54 is distinct from VMM 52, processing system 20 may use operations like those described above to locate a manifest (e.g., OS AC 55) for OS 54, and to prevent OS 54 from executing if OS 54 has been tampered with.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Also, although certain operations are described as being performed or controlled by an OEM in an example embodiment, other types of entities may perform or control operations in other embodiments, including without limitation entities that perform platform configuration, software installation, information technology (IT) assistance, etc. Also, this disclosure refers to the use of keys for various operations. It should be understood such use includes direct and indirect use. For instance, if a first key is used to generate a second key, and then the second key is used in an operation, both keys should be considered to have been used in the operation. The second key will have been used directly, and the first key will have been used indirectly.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. At least one non-transitory machine readable medium comprising instructions that when executed on a processing system cause the processing system to perform a method comprising:
   retrieving an encrypted version of a cryptographic key from nonvolatile memory of the processing system to a processing unit of the processing system during a boot process, wherein the nonvolatile memory is not included in a trusted platform module (TPM);
   using a key stored in nonvolatile storage in the processing unit to decrypt the encrypted version of the cryptographic key;
   retrieving a predetermined authentication code for software of the processing system;
   using the cryptographic key to compute a current authentication code for the software before executing any instructions from the software; and
   determining whether the software should be trusted, based at least in part on a comparison of the predetermined authentication code with the current authentication code.

2. The at least one medium of claim 1, wherein the using the cryptographic key to compute a current authentication code for the software comprises:
   using the cryptographic key to compute a current hashed message authentication code (HMAC) for the software.

3. The at least one medium of claim 1, wherein the using the cryptographic key to compute a current authentication code for the software comprises:
   using a key based on the cryptographic key to compute a current hashed message authentication code (HMAC) for the software.

4. The at least one medium of claim 1, wherein the software to be authenticated comprises boot firmware.

5. At least one non-transitory machine readable medium comprising preliminary boot instructions that when executed on a processing system cause the processing system to perform a method comprising:
   during a boot process, a processing unit of the processing system using a cryptographic processing unit key (PUK), stored in nonvolatile memory of the processing unit, to decrypt an encrypted version of an authentication key; and
   during the boot process, the processing unit using the authentication key to authenticate (a) a boot firmware image before executing any instructions from the boot firmware image, (b) at least part of a virtual machine monitor (VMM) before executing any instructions from the VMM, and (c) at least part of an operating system (OS) before executing any instructions from the OS.

6. The at least one non-transitory medium of claim 5, wherein (a) the processing unit is configured to serve as a bootstrap processor, (b) the at least one non-transitory medium is configured to serve as non-volatile boot storage for the bootstrap processor, (c) the bootstrap processor is to be coupled to the non-volatile boot storage via a bus, and (d) the bootstrap processor, non-volatile boot storage, and bus are all to be included in a local processing system.

7. A processing system comprising:
a processing unit with nonvolatile storage;
a cryptographic processing unit key (PUK) stored in the nonvolatile storage;
at least one nonvolatile storage component in communication with the processing unit but not included in the processing unit;
a candidate code module, which is based on an image derived from related code, in the at least one nonvolatile storage component; and
an augmented boot code module, included in the at least one nonvolatile storage component, comprising:
an encrypted version of an authentication key; and
instructions which, when executed by the processing unit, cause the processing unit to perform operations comprising:
executing code from the augmented boot code module before executing code from the candidate code module;
using the PUK to decrypt the encrypted version of an authentication key; and
using the authentication key to authenticate the candidate code module before executing any instructions from the candidate code module.

8. A processing system according to claim 7, wherein:
the at least one nonvolatile storage component comprises nonvolatile memory; and
the candidate code module comprises a boot firmware image.

9. A processing system according to claim 7, wherein:
the candidate code module comprises at least part of a virtual machine monitor image.

10. A processing system according to claim 7, wherein:
the at least one nonvolatile storage component comprises nonvolatile memory and a mass storage device; and
the candidate code module resides in the mass storage device.

11. A processing system according to claim 10, wherein:
the augmented boot code module resides in the nonvolatile memory.

12. A processing system according to claim 7, wherein the operation of using the authentication key to authenticate the candidate code module comprises:
using a key based at least in part on the authentication key to authenticate the candidate code module.

13. A processing system according to claim 7, wherein (a) the PUK is permanently burned into the processing unit, (b) the processing unit couples to the at least one nonvolatile storage component via a bus, and (c) the processing unit, the at least one nonvolatile storage, and the bus are all included in a local processing system but are not all located on a single integrated circuit.

14. An apparatus comprising:
a non-transitory machine-accessible medium; and
an augmented boot code module in the non-transitory machine-accessible medium but not included in a processing unit, wherein the augmented boot code module comprises:
an encrypted version of an authentication key; and
preliminary boot instructions to be executed during a boot process by the processing unit that includes nonvolatile storage and a cryptographic processing unit key (PUK) stored in the nonvolatile storage;
the preliminary boot instructions comprising instructions which, when executed by the processing unit, cause the processing unit to perform operations comprising:
using the PUK to decrypt the encrypted version of the authentication key; and
using the authentication key to authenticate a candidate code module before executing any instructions from the candidate code module.

15. An apparatus according to claim 14, wherein the instructions, when executed, cause the processing unit to authenticate a boot firmware image before executing any instructions from the boot firmware image.

16. An apparatus according to claim 14, wherein the instructions, when executed, cause the processing unit to authenticate at least part of a virtual machine monitor (VMM) before executing any instructions from the VMM.

17. An apparatus according to claim 14, wherein the instructions, when executed, cause the processing unit to authenticate at least part of an operating system (OS) before executing any instructions from the OS.

18. An apparatus according to claim 14, wherein the instructions, when executed, cause the processing unit to authenticate a candidate code module residing in at least one of the non-transitory machine-accessible medium and nonvolatile memory.

19. An apparatus according to claim 14, wherein the instructions, when executed, cause the processing unit to authenticate a candidate code module residing in a mass storage device.

20. An apparatus according to claim 14, wherein the operation of using the authentication key to authenticate the candidate code module comprises:
using a key based at least in part on the authentication key to authenticate the candidate code module.

21. An apparatus according to claim 14, wherein (a) the instructions, when executed, cause the processing unit to authenticate a boot firmware image before executing any instructions from the boot firmware image, (b) the processing unit is configured to serve as a bootstrap processor, (c) the non-transitory machine-accessible medium is configured to serve as non-volatile boot storage for the bootstrap processor, (d) the bootstrap processor is coupled to the non-volatile boot storage via a bus, and (e) the bootstrap processor, non-volatile boot storage, and bus are all included in a local processing system.

* * * * *